United States Patent
Joglekar et al.

(10) Patent No.: US 10,762,521 B2
(45) Date of Patent: Sep. 1, 2020

(54) SYSTEM AND METHOD FOR LOYALTY INTEGRATION FOR MERCHANT SPECIFIC DIGITAL WALLETS

(71) Applicant: JPMorgan Chase Bank, N.A., New York, NY (US)

(72) Inventors: Ajinkya P. Joglekar, Philadelphia, PA (US); Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 301 days.

(21) Appl. No.: 14/726,982

(22) Filed: Jun. 1, 2015

(65) Prior Publication Data

US 2016/0350789 A1    Dec. 1, 2016

(51) Int. Cl.
| | | |
|---|---|---|
| *G06Q 30/00* | (2012.01) | |
| *G06Q 30/02* | (2012.01) | |
| *G06Q 20/36* | (2012.01) | |
| *G06Q 20/38* | (2012.01) | |

(52) U.S. Cl.
CPC ......... *G06Q 30/0227* (2013.01); *G06Q 20/36* (2013.01); *G06Q 20/387* (2013.01); *G06Q 30/0233* (2013.01)

(58) Field of Classification Search
USPC .......................................................... 705/14
See application file for complete search history.

(56) References Cited

U.S. PATENT DOCUMENTS

| | | |
|---|---|---|
| 6,581,831 B2 | 6/2003 | Madani |
| 6,595,342 B1 | 7/2003 | Maritzen et al. |
| 6,665,687 B1 | 12/2003 | Burke |
| 6,697,799 B1 | 2/2004 | Neal et al. |
| 6,871,174 B1 | 3/2005 | Dolan et al. |
| 6,968,348 B1 | 11/2005 | Carone et al. |
| 7,066,382 B2 | 6/2006 | Kaplan |
| 7,069,244 B2 | 6/2006 | Strayer et al. |
| 7,260,549 B2 | 8/2007 | Speilmann et al. |
| 7,318,049 B2 | 1/2008 | Iannacci |

(Continued)

OTHER PUBLICATIONS

International Search Report and the Written Opinion of the International Searching Authority in PCT/US 16/34990 dated Aug. 29, 2016.

(Continued)

*Primary Examiner* — Alvin L Brown
(74) *Attorney, Agent, or Firm* — Hunton Andrews Kurth LLP (57) ABSTRACT

The invention relates to a computer-implemented system and method for loyalty integration to facilitate redemption of rewards using a mobile device. According to an embodiment of the present invention, a system and method comprise the steps of: connecting a merchant app, associated with a merchant, with a funding source associated with a financial institution, wherein the merchant app provides a merchant program to the user; identifying a number of points for conversion to stored value on the merchant app; converting the number of points to a stored value amount on the merchant app; loading the merchant app with the stored value; and responsive to a user request on the merchant app, performing a payment transaction for a purchase using the converted stored value.

16 Claims, 8 Drawing Sheets

(56) References Cited

U.S. PATENT DOCUMENTS

| | | | |
|---|---|---|---|
| 7,356,516 | B2 | 4/2008 | Richey et al. |
| 7,392,224 | B1 | 6/2008 | Bauer et al. |
| 7,506,804 | B2 | 3/2009 | Zajkowski et al. |
| 7,512,551 | B2 | 3/2009 | Postrel |
| 7,640,205 | B2 | 12/2009 | Michelassi et al. |
| 7,676,459 | B2 | 3/2010 | Carone et al. |
| 7,686,218 | B2 | 3/2010 | Hessburg et al. |
| 7,689,504 | B2 | 3/2010 | Warren |
| 7,742,970 | B2 | 6/2010 | Thierer et al. |
| 7,747,463 | B1 | 6/2010 | Phillips et al. |
| 7,753,259 | B1 | 7/2010 | Taylor et al. |
| 2001/0001856 | A1 | 5/2001 | Gould et al. |
| 2002/0026348 | A1* | 2/2002 | Fowler ............... G06Q 30/02 705/14.11 |
| 2003/0054888 | A1* | 3/2003 | Walker ............... G06Q 30/02 463/42 |
| 2004/0172340 | A1* | 9/2004 | Bishop ............. G06Q 30/0269 705/50 |
| 2007/0288372 | A1 | 12/2007 | Behar et al. |
| 2008/0040270 | A1 | 2/2008 | Buchheit et al. |
| 2012/0303425 | A1* | 11/2012 | Katzin ............... G06Q 20/027 705/14.4 |
| 2013/0262213 | A1 | 10/2013 | Jamkhedkar et al. |
| 2014/0351142 | A1 | 11/2014 | Royyuru |
| 2015/0278845 | A1* | 10/2015 | Sorem ............. G06Q 30/0226 705/14.25 |

OTHER PUBLICATIONS

International Preliminary Report on Patentability, Written Opinion of the International Searching Authority in PCT/US 16/34990 dated Aug. 29, 2016.

European Patent Office, Communication including Extended European Search Report, European Patent Application No. 16804214.1, pp. 1-4, Oct. 25, 2018.

* cited by examiner

SYSTEM AND METHOD FOR LOYALTY INTEGRATION FOR MERCHANT SPECIFIC DIGITAL WALLETS

FIELD OF THE INVENTION

The invention relates generally to a system and method for use of rewards currency, and more particularly to a system and method for loyalty integration to facilitate redemption of rewards using a merchant app on a mobile device.

BACKGROUND

Loyalty programs encourage consumers to make purchases with a particular brand or merchant by offering various forms of incentive. Consumers can accumulate points and/or rewards based on purchases made with the brand or merchant. For example, consumers may be entitled to a discount on a current purchase (5% off). According to another example, consumers may accumulate points based on a points system where points translate into some type of reward. Some programs may implement a tier system to reward initial loyalty and encourage more purchases. Loyalty programs effectively increase customer loyalty, retention and brand recognition.

In some instances, consumers do not perceive their rewards program to be particularly useful or valuable primarily because many points go unused. Oftentimes, a consumer will enroll to take advantage of the initial benefit (e.g., 25% off entire purchase with a new account) but falls short of accumulating enough points to experience a cash benefit. Some loyalty programs require a high threshold to receive any sort of reward (e.g., 20,000 points required to receive a $20.00 gift card). As a result, consumers are unable to enjoy the benefits of a loyalty program and thereby lose interest. Accordingly, the benefits of a loyalty program are not realized and customer loyalty is not achieved.

These and other drawbacks exist.

SUMMARY

According to one embodiment, the invention relates to a computer-implemented system and method for enabling the use of rewards currency with a mobile device. The system may be conducted on a specially programmed computer system comprising one or more computer processors, mobile devices, electronic storage devices, and networks. The system for loyalty integration for a merchant specific digital wallet, comprises: an electronic storage device storing consumer data and account data associated with each user; and a computer processor, coupled to the electronic storage device, programmed to perform the following: connect a merchant app, associated with a merchant, with a funding source associated with a financial institution, wherein the merchant app provides a merchant program to the user; identify a number of points for conversion to stored value on the merchant app; convert the number of points to a stored value amount on the merchant app; load the merchant app with the stored value; and responsive to a user request on the merchant app, perform a payment transaction for a purchase using the converted stored value.

According to another embodiment of the present invention, the computer-implemented system for loyalty integration for a merchant specific digital wallet comprises: an electronic storage device storing consumer data and account data associated with each user; and a computer processor, coupled to the electronic storage device, programmed to perform the following: connect a merchant app, associated with a merchant, with a funding source associated with a financial institution, wherein the merchant app provides a merchant program to the user; responsive to a user request on the merchant app, initiate a payment transaction for a purchase; determine whether the purchase is eligible for the merchant program; determine whether the funding source has enough value for a purchase amount; and debit the funding source an amount of funds equivalent to the purchase amount.

In addition, when the funding source has insufficient value for the purchase amount, the computer processor is further programmed to charge the remaining amount to an alternative payment mechanism, such as a credit card, debit account, etc.

The invention also relates to a computer implemented method for enabling the use of rewards currency using a mobile device, and to a computer readable medium containing program instructions for executing a method for loyalty integration for a merchant specific digital wallet.

The computer implemented system, method and medium described herein can provide the advantage of allowing the account holder to easily complete a payment transaction using their rewards currency on their mobile device, according to various embodiment of the invention. Another advantage that can be provided is increased loyalty due to the increased satisfaction of the account holder. The system facilitates the use and redemption of rewards points so that customers experience a benefit of purchasing with a particular merchant. That type of experience may enhance loyalty to the financial institution much more than a convention rewards program that takes significantly more effort to redeem the rewards currency. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to loyalty integration for merchant specific digital wallets. An embodiment of the present invention provides a cohesive and uniform way to integrate other loyalty programs as a funding source. Specifically, an embodiment of the present invention facilitates integration of loyalty platforms. For example, points may be converted into a stored value currency in a mobile account which may be in the form of a merchant application software ("app") to facilitate payment. According to another example, an embodiment of the present invention may connect a mobile app to a card in real-time so that the payment can seamlessly pull from the consumer's available credit or points bank as needed. Also, an embodiment of the present invention may provide for a split tender through a merchant app using points and then the remaining balance may be posted to another payment mechanism, e.g., credit card or other funding source. In these examples, the actual payment may flow through the merchant-specific app, but the funding source may come from the bank or other source.

An embodiment of the present invention provides seamless rewards currency integration into third-party apps. Accordingly, the various embodiments of the present invention allows for a points eco-system that may fund the universe of payment mechanisms utilizing new merchants and other mobile devices and technology (e.g., wearables, etc.).

An embodiment of the present invention is directed to converting points (e.g., rewards points) to stored value on a merchant-specific wallet app, such as Starbucks app. The system may use points to fund a payment with a merchant app. In this case, the user may pull more points (e.g., 2500 points converted to $25 in value on the Starbucks app) than is needed for a particular transaction (e.g., $2.50 for a coffee). The user may make purchases using the $25 worth of stored value on the merchant app. When the stored value is below a threshold amount, the consumer may be reminded to reload. Also, the stored value may be automatically replenished. Other funding sources and schemes may be applied.

According to another example, a merchant app may retrieve points in real-time. For example, the merchant app may pull the amount of points needed for a particular transaction, (e.g., 250 points for a $2.50 coffee). This example may ride the bank rails and use a loyalty services connection. In this example, the points bank may be debited for each transaction amount when the consumer makes a purchase. Accordingly, there is no remaining unused stored value amount on the merchant app.

Another example provides an option to perform a split tender for a purchase. In this example, a cup of coffee is $5.00 and the consumer only has $1.00 worth of points. The points may be used first to offset the purchase price amount. The remaining amount, e.g., $4.00, may be charged to an associated or otherwise identified credit card account (or other one or more funding sources) through the merchant app. In this example, the merchant would have to pay an interchange fee because a credit card is used. A split tender may fund the remaining amount using a debit card, other merchant apps or accounts and/or a combination thereof to avoid an interchange fee and/or other fees.

Figure 1:
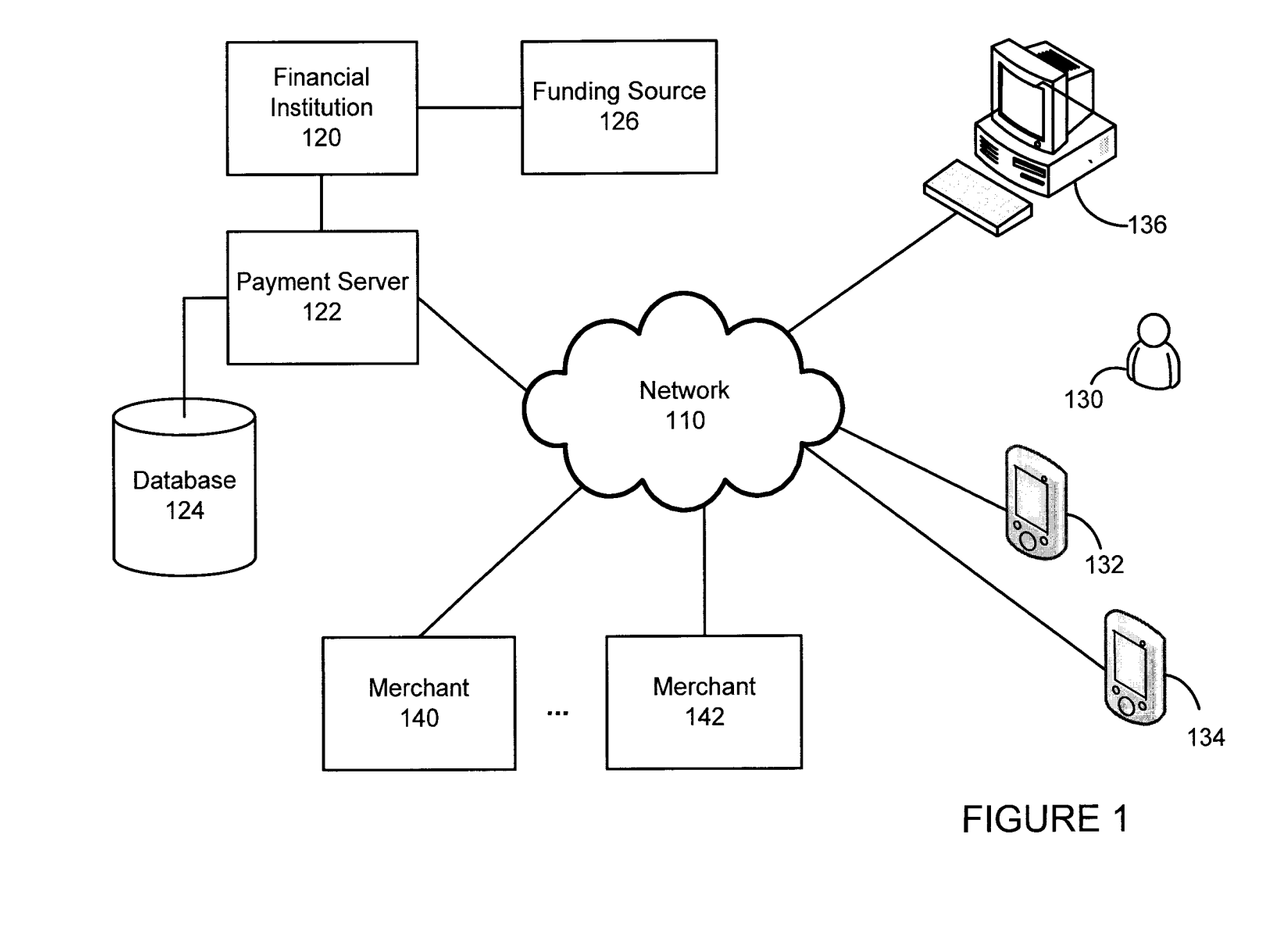
FIG. 1 is an exemplary diagram of a system for enabling use of rewards currency using a merchant app on a mobile device, according to one embodiment of the invention.

FIG. 1 is an exemplary diagram of a system for enabling use of rewards currency using a merchant app on a mobile device, according to one embodiment of the invention. The system of FIG. 1 enables an account holder to use rewards currency (e.g., rewards, points,) to make a purchase with a mobile device. As shown in FIG. 1, a consumer or user 130 may access a network 110 via various devices, including mobile device 132, 134, computer 136 as well as other communication and processing devices, including mobile phones, tablets, computers, wearables, etc. The consumer may access a mobile app or other program that runs on a mobile device, computer or other processing device that enables a consumer to access a merchant program.

Also shown in FIG. 1 is an account holder 130 of a financial institution who may communicate electronically with the financial institution 120 using a mobile device 132, 134 and a personal computing device 136. The mobile device 132, 134 may be a smart phone, such as an Apple iPhone, Samsung Galaxy, or Amazon Fire Phone, that includes a touch screen or other interactive display. The mobile device 132, 134 may also include other hardware and software enabling them to communicate using other communication channels, such as a near field communication (NFC) signals or a Bluetooth signals. The mobile device 132, 134 also typically includes hardware and software to enable communication with a cellular network and WiFi network. The personal computing device 136 may comprise a laptop computer, tablet computer, or desktop computer, for example. The account holder 130 may use the personal computing device 136 to execute various online transactions with the financial institution 120 at home or elsewhere.

The merchant app may be offered by a merchant, represented by Merchant 140, 142, or a third party service provider. The consumer may also access a payment system provided by a financial institution 120 such as retail bank, according to one embodiment of the invention. The payment system may be embodied primarily or entirely in a payment server 122 (which may include one or more databases represented by 124) owned and/or operated by the financial institution 120 that interfaces with a number of other servers and entities via one or more networks.

Payment server 122 that enables user or account holder 130 to pay with rewards currency may interface with other servers owned and/or operated by the financial institution 120 and/or other entities. For example, payment server 122 may interface with a credit card server and associated database that stores and processes credit card transactions for credit card holders of the financial institution 120. Payment server 122 may also interface with a rewards program server and associated database that stores and processes rewards information for account holders at the financial institution 120. The foregoing description is merely one example of a configuration for such functions and is not intended to be limiting.

Various embodiments of the invention may also utilize an established payment network such as the VISA network, MasterCard network, NYCE network, or other similar network to transmit information between various entities using the system. For example, payment server 122 may use the VISA network for authorization and settlement of transactions. However, use of such established credit and debit networks is not required according to various embodiments of the invention. Payment Server 122 may be configured to use other networks for executing payment transactions and transmitting information to the cardholders, merchants, and financial institutions. Payments can be made by rendering such other payment network's digital tender on the mobile device 132, 134.

Referring again to FIG. 1, the network 110 enables communications between various computing devices and storage devices in the system. The network 110 may comprise one or more of the Internet, a wide area network (WAN), a local area network (LAN), and/or an intranet, according to various embodiments of the invention. The network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

As shown in FIG. 1, a user 130 may use a mobile device 132, 134 to make purchases offered or provided by a merchant or other service or product provider. For example, the mobile device 132, 134 may include a mobile app that enables the user to make purchases. The user's ability to make purchases may be funded from a funding source 126. For example, a funding source may be funded by a financial institution in the form of points, credit and/or other metric or currency. Also, alternative and/or multiple funding sources may be used. For example, points from other providers or merchants including affiliates, other financial institutions, etc. may be used to fund a funding source 126. An embodiment of the present invention may merge various types of loyalty programs as funds (e.g., points, points converted from other loyalty programs) into the funding source. Also, other variations of points may be converted, e.g., frequent flyer miles may be converted to points and then used to fund the funding source so that the consumer can make purchases. Other variations may be implemented.

Funding source 126 may be specific to one consumer. Also, a funding source may be for a family of consumers or a group of consumers where points and benefits may be shared, allocated and/or distributed to the members.

An embodiment of the present invention may provide auto-suggestions to the consumer. For example, based on the consumer's spending pattern and other activity, an embodiment of the present invention may provide customized funding, loyalty and/or other suggestions. For example, an embodiment of the present invention may observe that a particular consumer is frequently traveling to California and suggest an airline loyalty program for a specific airline. The system of an embodiment of the present invention may also recommend a hotel loyalty program based on the consumer's past stays, preferred quality of hotels and location. For example, frequently flyer miles may then be converted into stored value for a merchant (or type of merchant) that is of interest to a consumer, such as a consumer's preferred coffee shop (e.g., a consumer purchases coffee every morning at a Joe's coffee beanery). Also, the frequent flyer miles and other purchases from other merchants may be used to accumulate hotel loyalty points for an upcoming vacation. The system of an embodiment of the present invention may provide rewards, discounts and benefits that are aligned with the loyalty points (e.g., beach supplies for the upcoming beach vacation). By merging points accumulated from various loyalty programs, an embodiment of the present invention may help a consumer reach purchase goals quicker and more efficiently.

An embodiment of the present invention may support merging points from affiliated merchants. In according with the embodiments of the present invention, rewards points from different loyalty programs may be converted based on a loyalty point exchange rate (e.g., 10 pts convert to 5 cents for one merchant, 100 points convert to 10 cents for another merchant, etc.). Also, the conversion system may be vary based on factors, such as consumer profile, merchant considerations, types of purchases, season/time of purchase, etc. The conversion system may be designed to encourage a particular purchase behavior, etc. Also, the conversion system may focus on customer retention for highly valued customers.

Having described an example of the hardware, software, and data that can be used to run the system, an example of the method and customer experience will now be described. The method will be described primarily as an example in which a customer of a loyalty program downloads a software application (sometimes referred to as an "app") and uses it for accumulating points and making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the consumer's mobile device, and with purchases from various providers.

Figure 2:
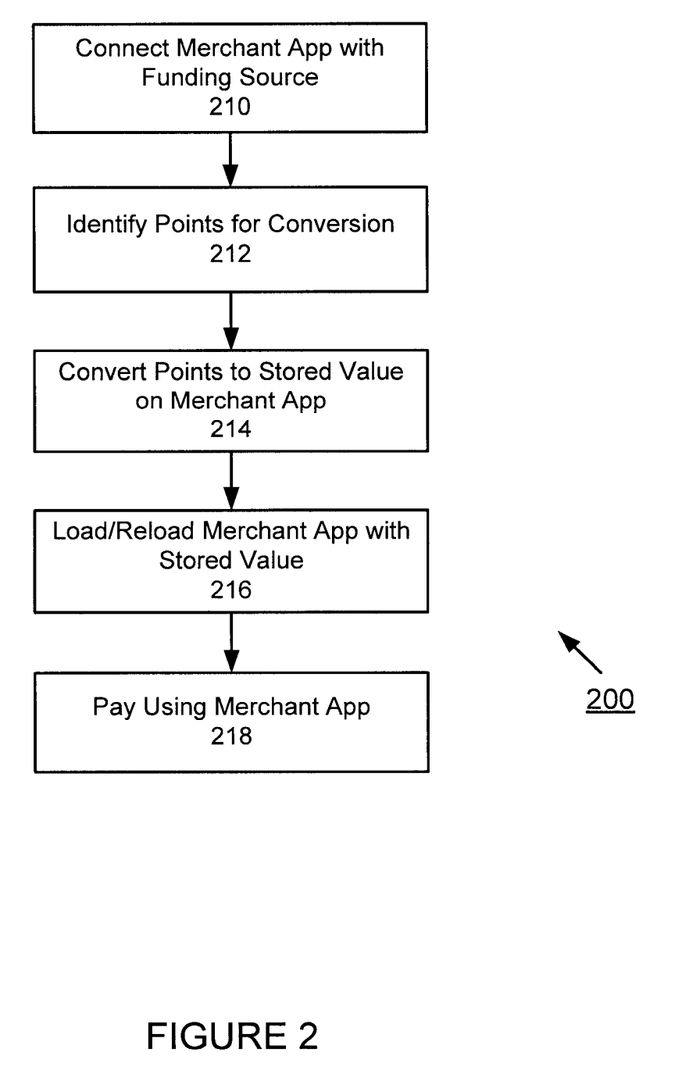
FIG. 2 is an exemplary diagram of a method for converting loyalty points into stored value, according to an embodiment of the present invention.

FIG. 2 is an exemplary diagram of a method for converting loyalty points into stored value, according to an embodiment of the present invention. At step 210, a user may connect a merchant app with a funding source. At step 212, the user may identify points for conversion. At step 214, an embodiment of the present invention may convert the points to stored value on the merchant app. At step 216, the stored value may be loaded or reloaded on the merchant app. At step 218, the user may then pay for a purchase using the stored value on the merchant app. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

An embodiment of the present invention is directed to converting points (e.g., rewards points) to stored value on a merchant-specific wallet app, e.g., merchant app. In this case, the user may identify a set amount of points for conversion into stored value and make purchases from the bank of stored value. For example, 2500 points may convert to $25 in value on the merchant app.

A merchant may send its consumer an offer to download a merchant app, either by email, text, or a personalized message on a website. The customer may download the merchant app, e.g., by visiting an app store using his or her mobile device. Also, a financial institution may send an offer message to all or a certain subset of its customers, e.g., card holders of a particular type of credit card. The message may invite the customer to download the merchant app onto his or her mobile device 132, 134.

At step 210, a user may connect a merchant app with a funding source. For example, the funding source may be a financial entity, such as a bank. Other funding sources and funding structures/architectures may be implemented. For example, the funding source may access points from multiple different sources. The points may be from different merchants, types of merchants, etc. For example, a conversion economy may be implemented. In this example, for one merchant, each point may be converted to 10 cents. For another merchant, each point may be converted to 1 cent. For a grocery merchant, each point may be converted to 5 cents. Loyalty brand points may be converted at 7 cents per point. Various conversion economies may be realized and implemented.

At step 212, the user may identify points for conversion into stored value on the merchant app. For example, the user may set 2500 points for conversion to $25. Also, when the user reaches a predetermined threshold of points, an embodiment of the present invention may automatically convert points into a stored value amount. For example, the user may program every 1,000 points for conversion to $10. Also, the user may program conversion in $20 increments, an embodiment of the present invention may then make the appropriate conversion of points. Other user preferences may be implemented.

At step 214, an embodiment of the present invention may convert the points to stored value on the merchant app. The stored value may be placed on a mobile app, card and/or other payment mechanism. The stored value may be available for a specific merchant through the merchant app. According to another embodiment, the stored value may be available for general purchases, categories of purchases, etc. For example, the stored value may be used for groceries in general. In this example, the stored value is not tied to a particular merchant or grocery store.

As noted at step 212, the user may identify points for conversion. Also, the user may program the conversion at predetermined intervals, e.g., each month, when a stored value reaches a low threshold, when the user has accumulated a number of points above a threshold, in response to an event, purchase, etc. An embodiment of the present invention provides an open loyalty program where a user can accumulate points from various loyalty and other programs and then convert the loyalty points into stored value at a particular merchant, for example. Oftentimes, user may earn points but never redeem them because they are unable to earn enough to redeem. For example, some loyalty programs provide increments of $20.00 but some consumers are unable to accumulate enough points to experience a benefit.

At step 216, the stored value may be loaded or reloaded on the merchant app. The loading and reloading may be selected by the user and may also occur automatically. For example, loading and reloading may occur periodically (e.g., first of month), in response to low or high balance, etc.

At step 218, the user may then pay for a purchase using the stored value. The purchase may occur in store, e.g., a point-of-sale device, using the mobile app. Also, the user may make purchases on a website, online, phone call, etc.

Figure 3:
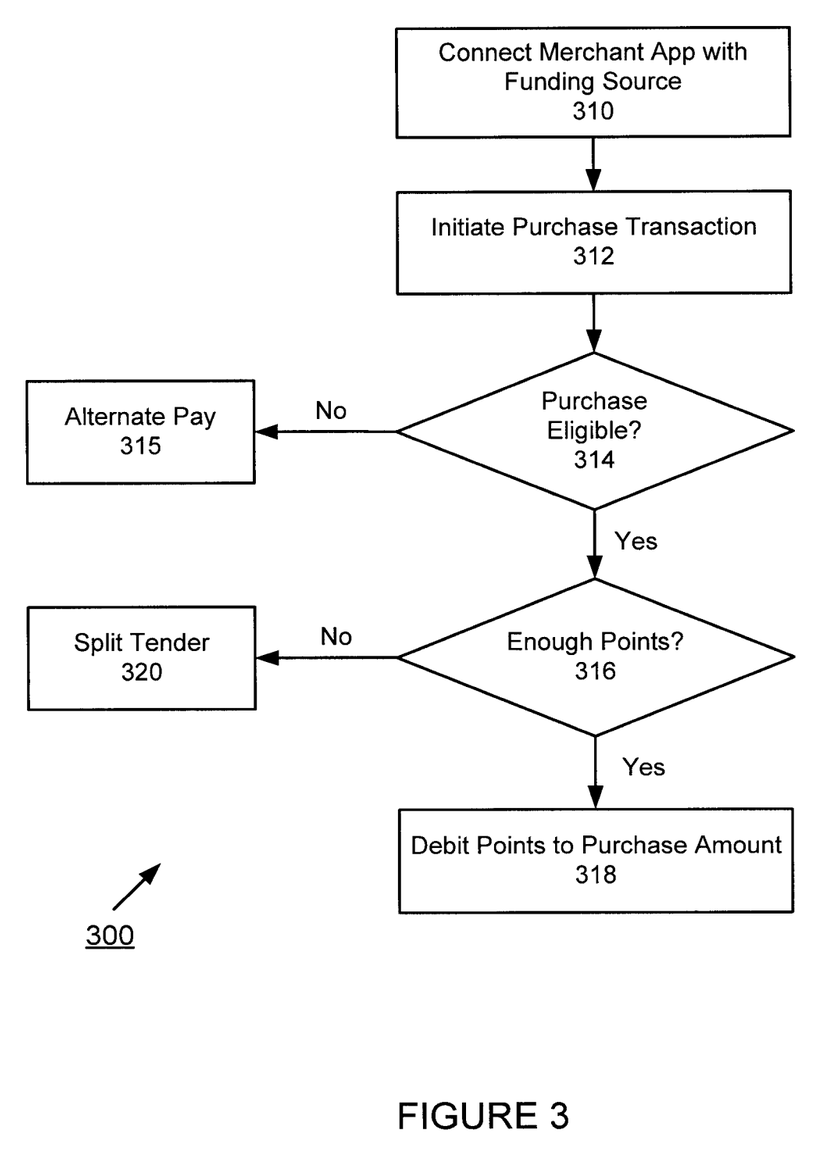
FIG. 3 is an exemplary diagram of a method for converting loyalty points into stored value, according to an embodiment of the present invention.

FIG. 3 is an exemplary diagram of a method for converting loyalty points into stored value, according to an embodiment of the present invention. At step 310, the user may connect a merchant app with a funding source. At step 312, the user may initiate a purchase. At step 314, an embodiment of the present invention may determine whether the purchase is eligible. If the purchase is not eligible, an alternate payment instrument may be used, at step 315. At step 316, if the purchase is eligible, an embodiment of the present invention may determine if there are enough points to make the purchase. At step 318, if there are enough points, the points may be debited for the value needed to make the purchase. If there are not enough points, then an embodiment of the present invention may then perform a split tender, at step 320. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

According to an embodiment of the present invention, a merchant may use points in real-time for a transaction. In this example, a merchant app only retrieves the amount of points needed for a particular transaction, e.g., 250 points for a $2.50 coffee. In this example, the merchant app may debit points from the consumer's associated point bank.

At step 310, the user may connect a merchant app with a funding source. For example, the funding source may be a financial entity, such as a bank. Other funding sources and structures may be implemented. For example, the funding source may access points from multiple different sources. The points may be from different merchants, types of merchants, etc. For example, a conversion economy may be implemented.

At step 312, the user may initiate a purchase transaction. The merchant app may be specific for a particular merchant as well as other affiliates, partners, third parties, etc. The merchant app may also be a general purchase app that enables a user to make purchases from multiple merchants, product providers, service providers, etc.

At step 314, an embodiment of the present invention may determine whether the purchase is eligible. For a merchant specific app, an eligible purchase may include a purchase made from the particular merchant. Also, a purchase may be deemed eligible based on various criteria, e.g., merchant affiliations, associations, agreements, etc. Other qualifications and restrictions may be applied. At step 315, if the purchase is not eligible, an alternate payment instrument may be used. The alternate payment instrument may be another funding source, credit card, debit card, etc.

At step 316, if the purchase is eligible, an embodiment of the present invention may determine if there are enough points to make the purchase. In this example, an embodiment of the present invention may convert points on a transaction-by-transaction basis. The user may initiate a purchase transaction when a determination is made whether the transaction qualifies for stored value purchase. This avoids a user converting a large amount of points into a stored value amount only to not use all the stored value. By making the conversion on a transaction basis, the user does not have to guess whether there is sufficient stored value or whether stored value will go unused and thereby wasted.

At step 318, if there are enough points, the points may be debited for the value needed to make the purchase. For example, a user may make a purchase at a coffee store. An embodiment of the present invention may determine if the purchase is eligible and then determine how many points are needed to make the purchase.

If there are not enough points, then an embodiment of the present invention may perform a split tender, at step 320. There may be instances, where the user does not have enough points for the entire purchase. In this case, the remainder of the purchase may be completed with another purchase mechanism, such as the user's credit card or other funding source.

For example, a cup of coffee is $5.00 and the consumer only has $1.00 worth of points. The points are automatically used first. The remaining amount, e.g., $4.00, is charged to an associated or otherwise identified credit card account through a merchant app. In this example, the merchant would have to pay an interchange fee because a credit card is used.

Figure 4:
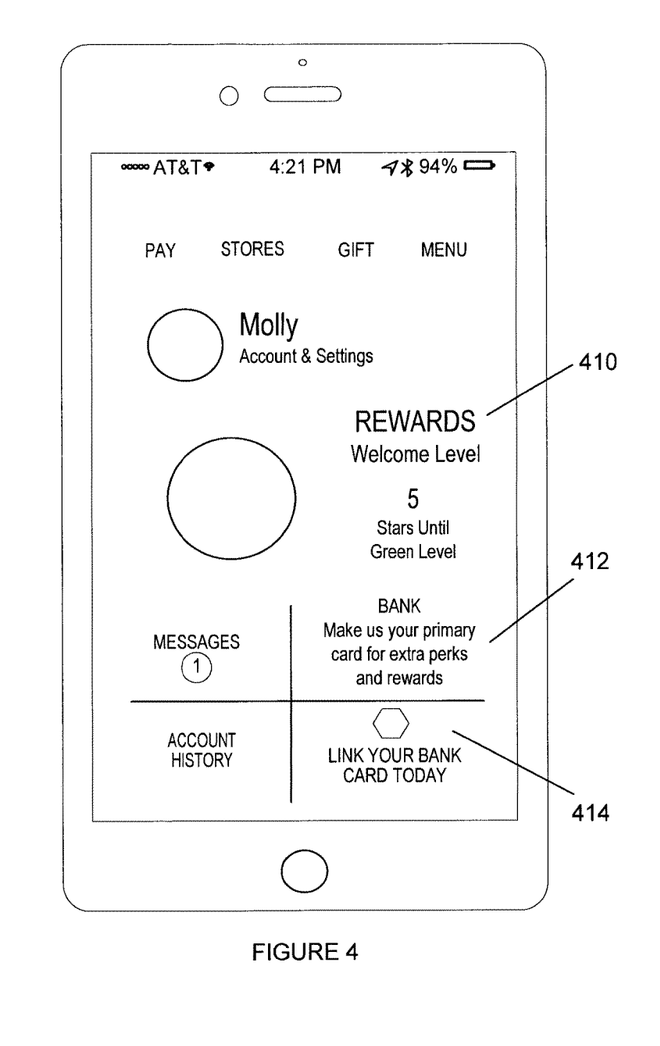
FIGS. 4-7 are exemplary screen shots illustrating loyalty integration for merchant specific digital wallet, according to an embodiment of the present invention.

FIGS. 4-7 are exemplary screen shots illustrating loyalty integration for merchant specific digital wallet, according to an embodiment of the present invention. FIG. 4 illustrates one example of a home screen of a merchant app on a mobile device. If the account holder decides to use their rewards currency to make a purchase at a merchant, the account holder may tap the merchant's icon. The app may then prompt the account holder to log on to the merchant app by presenting the account holder with a log on screen. The account holder can log on by entering his or her user ID and password. The system uses the user ID and password to authenticate the account holder. Once the account holder has been authenticated, the merchant app presents the account holder with a screen allowing the consumer to initiate a transaction.

As shown in FIG. 4, the home screen provides useful information about a user's current rewards status, as shown by 410. In this example, a message may be displayed that informs the consumer about earning extra points and rewards, at 412. For example, a bank may offer perks and rewards to a card holder through the merchant app. An icon 414 may be displayed that provides the consumer with an option to link the merchant app with a participating bank or other funding source.

Figure 5:
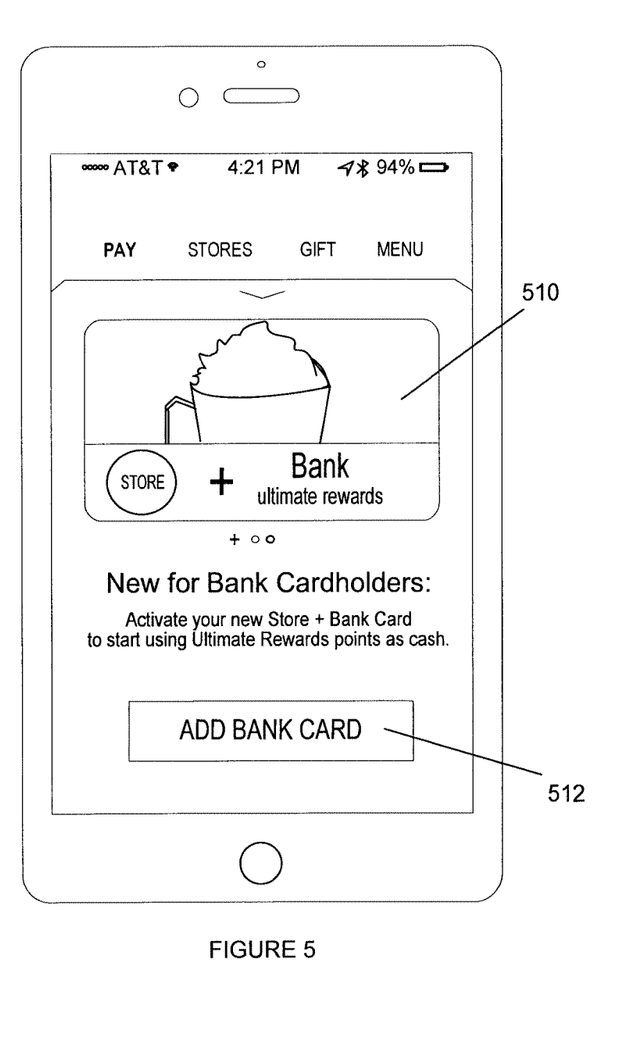

As shown in FIG. 5, a consumer may activate a merchant app and start using rewards points as stored value with cash value. In this example, the merchant app is merged with the bank rewards program, as shown by 510. An "add bank card" icon 512 may be displayed for the user to activate. Other funding sources may be applied as well.

Figure 6:
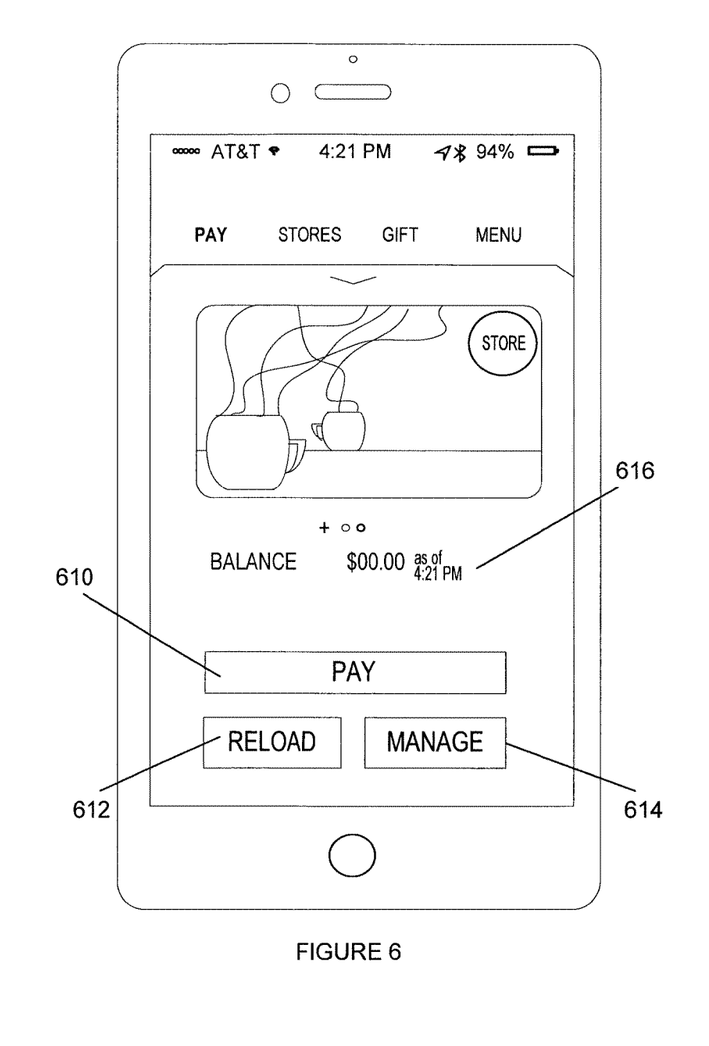

FIG. 6 is an exemplary screen shot illustrating an activated merchant app. This screen enables a user to pay 610, reload 612 and manage 614 the merchant card. The screen also provides a current balance of the associated account, at 616.

Figure 7:
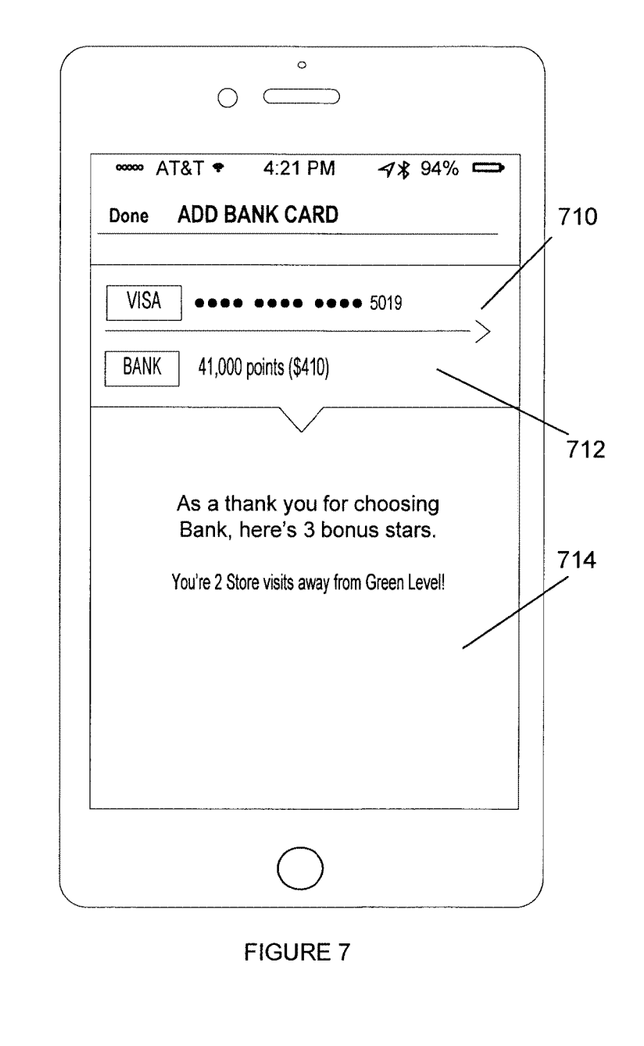

As shown in FIG. 7, the consumer's bank card has been added. In this example, the consumer has added a bank card (e.g., Visa card) to the merchant account, at 710. As shown, the consumer has 41,000 points which converts to $410, at 712. As an extra bonus, the consumer has received merchant rewards for signing up for the program, as shown by 714.

Figure 8:
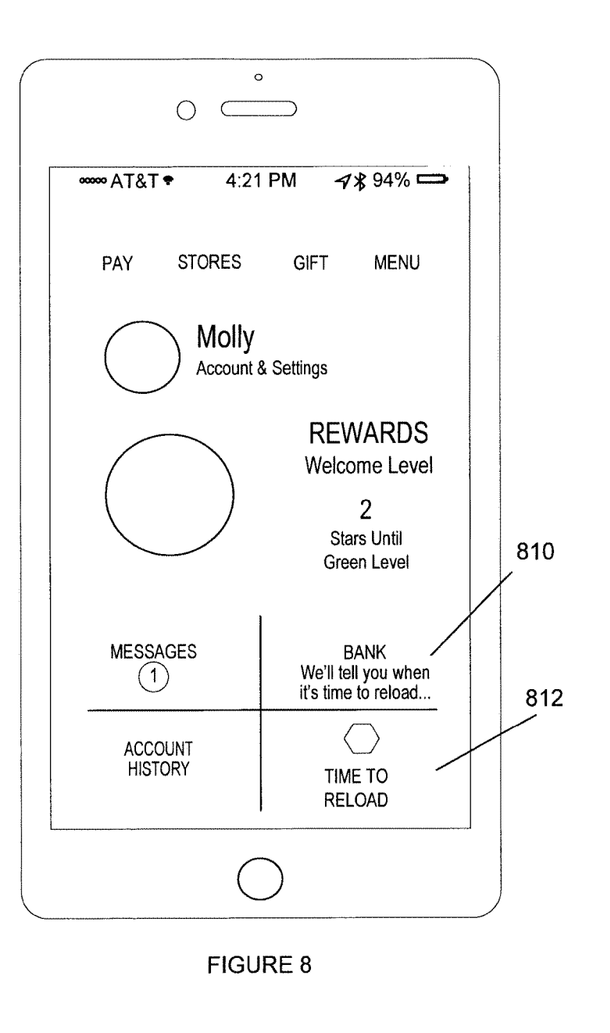
FIGS. 8-11 are exemplary screen shots illustrating a transaction using a merchant app, according to an embodiment of the present invention.

FIGS. 8-11 are exemplary screen shots illustrating a transaction using a merchant app, according to an embodiment of the present invention. As shown in FIG. 8, the consumer's merchant app is integrated with a participating financial institution, as shown by 810. Other funding sources may be used. Also, multiple funding sources may be implemented. A message reminding the consumer that it's time to reload may be displayed, at 812. Other messages, reminder and/or alerts may be provided. Also, the consumer may program automatic reloads based on timing, amount thresholds, events, etc.

Figure 9:
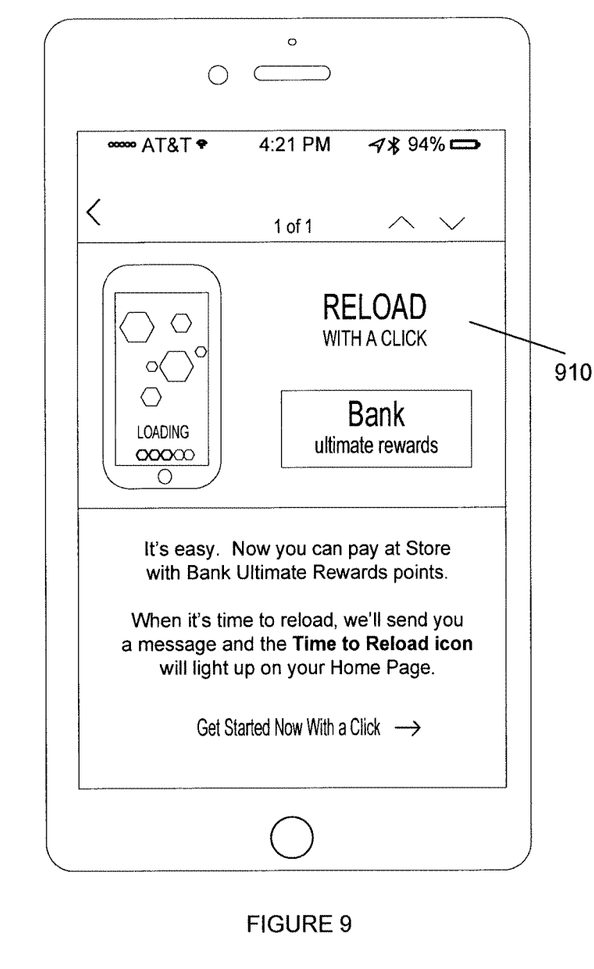

By selecting the "time to reload" icon at 812, a consumer may view additional details as shown in FIG. 9, which is an exemplary screen shot illustrating a mobile device app, according to an embodiment of the present invention. A personalized message to the consumer may be displayed, at 910. The consumer may pay at a merchant location with rewards points provided by the bank. When it is time to reload, a message may be provided and the time to reload icon may be highlighted to the user. Other types of messages, alerts and/or reminders may be provided. This may also be personalized based on the consumer's preferences.

Figure 10:
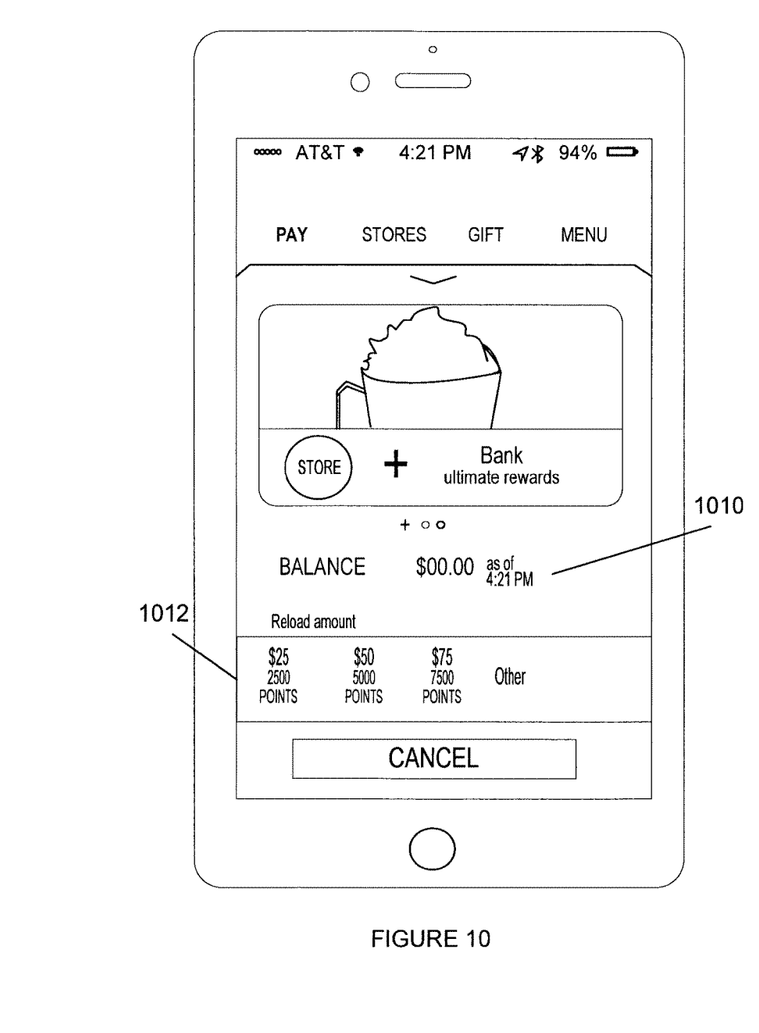

FIG. 10 is an exemplary screen shot illustrating a mobile device app, according to an embodiment of the present invention. As shown in FIG. 10, the current balance is zero dollars, as shown by 1010. The consumer is provided reload options, at 1012. In this example, the reload amount may be $25 (or 2500 points), $50 (or 5000 points), $75 (or 7500 points) or other option. The reload amounts may be standard for all consumers. Also, the reload amounts may be catered or customized to the consumer's current balance. In addition, the reload amounts may be tailored to the consumer's spending habits, transaction history and/or other behavior metrics. Further, the reload amount may be customized or in the form of other types of currency or equivalent to currency. For example, the reload amounts may be converted to number of coffee drinks (even catered to the consumer's usual drink, which may be a medium latte with soy milk). Other variations may be realized and implemented. The consumer may select a reload amount.

Figure 11:
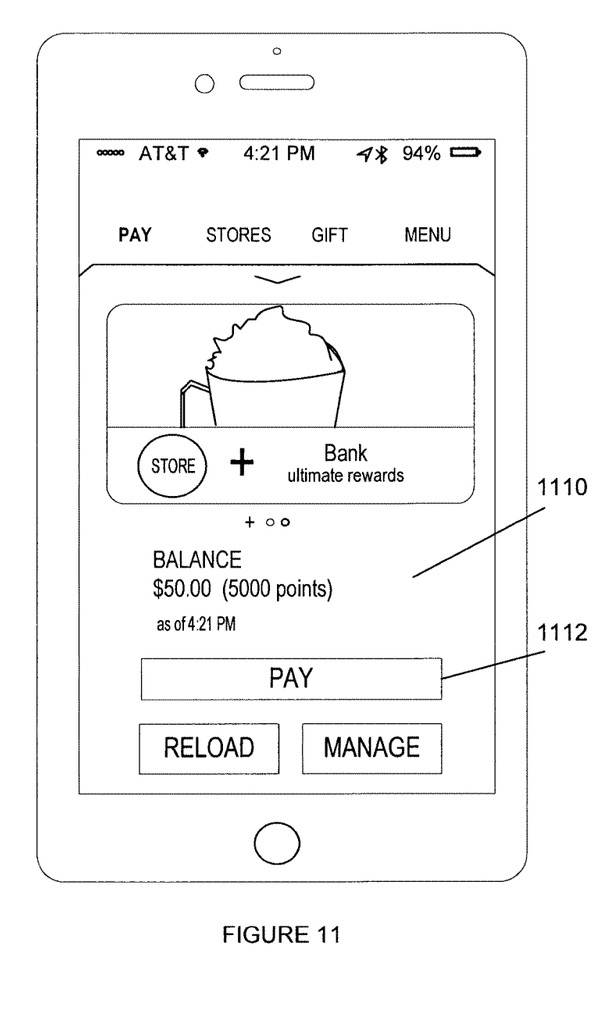

FIG. 11 is an exemplary reload screen, according to an embodiment of the present invention. As shown in FIG. 11, the consumer has selected to reload with $50 or 5000 points, as shown by 1110. The consumer may then proceed with a purchase, by selecting pay at 1112. Depending on the merchant, the merchant app may then display a bar code, QR code, or other label or image for payment.

Figure 12:
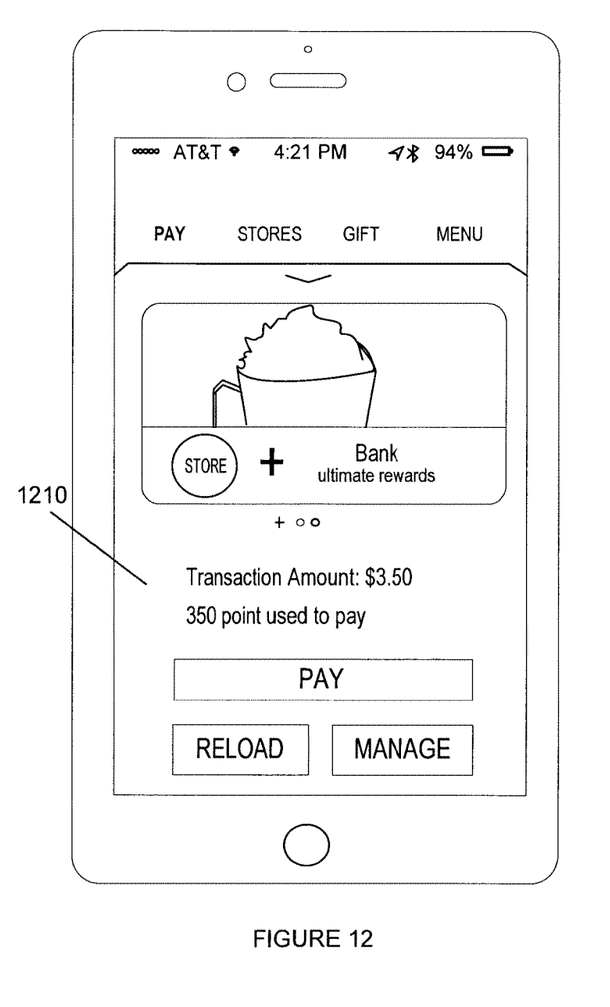
FIG. 12 is an exemplary screen shot illustrating a transaction using a merchant app, according to an embodiment of the present invention.
Figure 13:
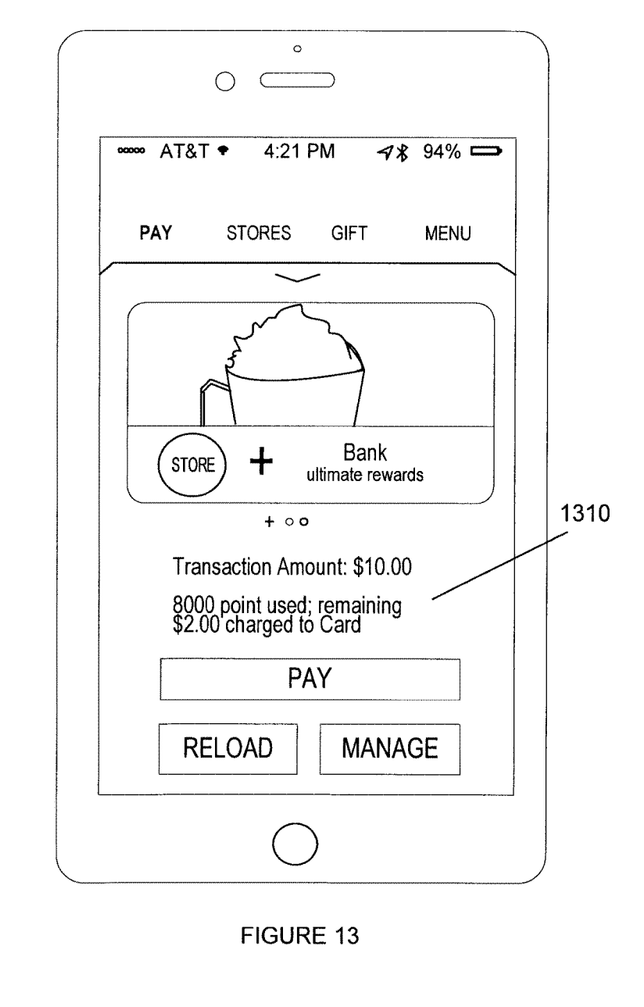
FIG. 13 is an exemplary screen shot illustrating a transaction using a merchant app, according to an embodiment of the present invention.

FIG. 12 is an exemplary screen shot illustrating a transaction using a merchant app, according to an embodiment of the present invention. In FIG. 12, a consumer may initiate a payment for a purchase. Upon selecting the pay icon, an embodiment of the present invention may automatically convert reward points into a stored value amount to make the purchase, as shown by 1210. If consumer does not have enough rewards points to make the purchase, an embodiment of the present invention may make a split tender where the remaining amount is paid using the bank card or other purchase mechanism. FIG. 13 is an exemplary screen shot illustrating a split tender as shown by 1310, according to an embodiment of the present invention. Also, an embodiment of the present invention use an alternative payment.

According to other embodiments of the invention, the merchant app can provide additional functionality to find participating merchants at which the user can use their rewards currency to make a purchase, and/or special offers. The merchant app may also send push notifications to the account holder based on his or her location. If the account holder has allowed his or her location to be tracked and has enabled alerts, then the app will present push notifications when the account holder is in proximity of one or more participating merchants. Initially, the app may present a message informing the account holder that they are able to pay using their rewards cash at a nearby merchant. If the account holder responds to that message by opening the app, a screen may be presented that shows the nearby merchants and their distance.

An advantage that can be provided by various embodiments of the invention is increased loyalty due to the increased satisfaction of the account holders. The system not only can make it very easy for the account holder to see the amount of his or her available rewards currency, but also proactively informs the account holder of opportunities to use it, and makes the payment process very simple. Consequently, the account holder may have a very positive experience of getting a discount when they did not expect it. This type of experience may enhance loyalty to the financial institution much more than a convention rewards program that may take significantly more effort to redeem the rewards currency.

While the foregoing examples show the various embodiments of the invention in one physical configuration, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 100 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although an example of a user communication device 132, 134, 136 is shown in FIG. 1, exemplary embodiments of the invention may utilize other types of communication devices whereby a user may interact with a network that transmits and delivers data and information used by the various systems and methods described herein. The user communication device may include a microprocessor, a microcontroller or other device operating under programmed control. The user communication device may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The user mobile device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The user communication device may also include a network-enabled appliance, a browser-equipped or other network-enabled mobile phone, a smart phone, or another TCP/IP client or other device. The mobile device 132, 134 may include various connections such as a cell phone connection, WiFi connection, Bluetooth connection, and/or near field communication (NFC) connection, for example.

As described above, FIG. 1 includes representative server 122, and user communication devices 132, 134, 136 each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, or simply software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 132, 134. As used herein, a user interface may include any hardware, software, or combination of hardware and software used by the processor that allows a user to interact with the processor of the communication device. A user interface may be in the form of a dialogue screen for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in any number of environments for any number of purposes.

What is claimed is:

1. A computer-implemented system for loyalty integration for a merchant specific digital wallet, the system comprising:
an electronic storage device storing consumer data and account data associated with each user; and
a computer processor, coupled to the electronic storage device, programmed to perform the following:
connect a merchant app, associated with a merchant, with a funding source associated with a financial institution, wherein the merchant app provides a merchant program to the user and wherein the merchant app is downloaded on a mobile device associated with the user;
identify a source of points, earned with a user account at the financial institution, for conversion to a stored value currency on the merchant app, wherein the points comprise one or more of loyalty points associated with the financial institution and loyalty points associated with one or more third-party loyalty programs;
convert an identified number of points from the point source to stored value currency on the merchant app;
automatically convert, when the identified source of points exceeds a user-defined point threshold, a user-defined number of points from the point source to stored value currency on the merchant app;
automatically convert, when a user-defined low remaining balance threshold on the merchant app is satisfied, a number of points associated with the financial institution, the additional one or more other merchants and the additional one or more other loyalty programs to meet a user-defined stored value amount on the merchant app;
load the merchant app with the stored value;
responsive to a user request on the merchant app, perform a payment transaction for a purchase with the merchant using the converted stored value as at least partial payment for the payment transaction; and
automatically provide at least one suggestion to the user, the suggestion comprising at least one of a recommendation for a specific merchant inclusion based on user spending patterns and a customized automatic point conversion strategy for a merchant based on user spending patterns.

2. The system of claim 1, wherein the funding source is funded by the user's financial account at the financial institution.

3. The system of claim 1, wherein the funding source is funded by a plurality of funding entities.

4. The system of claim 1, wherein the funding source is funded by a bank card associated with the user.

5. A computer-implemented system for loyalty integration for a merchant specific digital wallet, the system comprising:
an electronic storage device storing consumer data and account data associated with each user; and
a computer processor, coupled to the electronic storage device, programmed to perform the following:
connect a merchant app, associated with a merchant, with a funding source associated with a financial institution, wherein the merchant app provides a merchant program to the user and wherein the merchant app is downloaded on a mobile device associated with the user;
responsive to a user request on the merchant app, initiate a payment transaction for a purchase;

determine whether the purchase is eligible for the merchant program;
determine whether the funding source has enough value for a purchase amount; and
debit the funding source an amount of funds equivalent to the purchase amount, wherein the amount of funds are based on points earned and associated with the financial institution and one or more other merchants different from the merchant.

6. The system of claim 5, wherein the computer processor is further programmed to:
when the funding source has insufficient value for the purchase amount, charge the remaining amount to an alternative payment mechanism.

7. The system of claim 5, wherein the purchase is eligible when the purchase is made from a participating merchant.

8. The system of claim 5, wherein the funding source is funded by the user's financial account at the financial institution.

9. A non-transitory computer readable medium containing program instructions for loyalty integration for a merchant specific digital wallet, wherein execution of the program instructions by one or more processors of a computer system causes the one or more processors to carry out the steps of:
connecting a merchant app, associated with a merchant, with a funding source associated with a financial institution, wherein the merchant app provides a merchant program to the user and wherein the merchant app is downloaded on a mobile device associated with the user;
identifying a source of points, earned with a user account at the financial institution, for conversion to a stored value currency on the merchant app, wherein the points are earned and associated with the financial institution and wherein the points comprise one or more of loyalty points associated with the financial institution and loyalty points associated with one or more third-party loyalty programs;
converting an identified number of points from the point source to stored value currency on the merchant app;
automatically converting, when the identified source of points exceeds a user-defined point threshold, a user-defined number of points from the point source to stored value currency on the merchant app;
automatically converting, when a user-defined low remaining balance threshold on the merchant app is satisfied, a number of points associated with the financial institution, the additional one or more other merchants and the additional one or more other loyalty programs to meet a user-defined stored value amount on the merchant app;
loading the merchant app with the stored value;
responsive to a user request on the merchant app, performing a payment transaction for a purchase with the merchant using the converted stored value as at least partial payment for the payment transaction; and
automatically providing at least one suggestion to the user, the suggestion comprising at least one of a recommendation for a specific merchant inclusion based on user spending patterns and a customized automatic point conversion strategy for a merchant based on user spending patterns.

10. The computer readable medium of claim 9, wherein the funding source is funded by the user's financial account at the financial institution.

11. The computer readable medium of claim 9, wherein the funding source is funded by a plurality of funding entities.

12. The computer readable medium of claim 9, wherein the funding source is funded by a bank card associated with the user.

13. A non-transitory computer readable medium containing program instructions for loyalty integration for a merchant specific digital wallet, wherein execution of the program instructions by one or more processors of a computer system causes the one or more processors to carry out the steps of:
connecting a merchant app, associated with a merchant, with a funding source associated with a financial institution, wherein the merchant app provides a merchant program to the user and wherein the merchant app is downloaded on a mobile device associated with the user;
responsive to a user request on the merchant app, initiating a payment transaction for a purchase;
determining whether the purchase is eligible for the merchant program;
determining whether the funding source has enough value for a purchase amount; and
debiting the funding source an amount of funds equivalent to the purchase amount, wherein the amount of funds are based on points earned and associated with the financial institution and one or more other merchants different from the merchant.

14. The computer readable medium of claim 13, wherein the one or more processors further carry out the step of:
when the funding source has insufficient value for the purchase amount, charging the remaining amount to an alternative payment mechanism.

15. The computer readable medium of claim 13, wherein the purchase is eligible when the purchase is made from a participating merchant.

16. The computer readable medium of claim 13, wherein the funding source is funded by the user's financial account at the financial institution.

* * * * *